United States Patent
Chambers

Patent Number: 5,949,251
Date of Patent: Sep. 7, 1999

[54] REGISTER-BASED PROGRAMMABLE POST-SILICON SYSTEM TO PATCH AND DYNAMICALLY MODIFY THE BEHAVIOR OF SYNCHRONOUS STATE MACHINES

[75] Inventor: Peter Chambers, Scottsdale, Ariz.

[73] Assignee: Vlsi Technology, Inc., San Jose, Calif.

[21] Appl. No.: 08/904,918

[22] Filed: Aug. 1, 1997

[51] Int. Cl.⁶ .................................................. H03K 19/173
[52] U.S. Cl. .................................. 326/46; 326/38; 326/93
[58] Field of Search .................................. 326/37–41, 46, 326/93; 364/488–491

[56] References Cited

U.S. PATENT DOCUMENTS

| 5,097,151 | 3/1992 | Eerenstein et al. | 326/46 |
| 5,778,251 | 7/1998 | Kuroiwa et al. | 326/46 |
| 5,825,199 | 10/1998 | Shelton et al. | 326/46 |

*Primary Examiner*—Jon Santamauro
*Assistant Examiner*—Don Phu Le
*Attorney, Agent, or Firm*—Wagner, Murabito & Hao

[57] ABSTRACT

The present invention allows the behavior of a state machine to be readily modified by software after it has been fabricated in silicon. To perform these modifications, the present invention uses special patch registers, multiplexers, and comparators to bypass certain states within the sequence of states within the combinatorial logic of the state machine and/or add new state sequences. Each patch register stores a state to be patched, a next state, and outputs. The state to be patched is the state that will be modified, while the next state is the state the state machine transitions into from the state to be patched, and the outputs are the outputs generated and asserted by the state machine while within the next state. Many such patch registers can be used by the present invention to define many modifications. Using this patch mechanism, the present invention allows new states to be added and existing states to be removed from the sequence of states that the state machine cycles through. To implement the functionality of the patch registers within the present invention, a separate comparator is connected to each patch register to determine when the present state of the state machine matches the state to be patched as stored within each respective patch register. When these values match, the corresponding comparator sends control signals causing the multiplexers to transfer into the state machine the next state and outputs as stored within that particular patch register that matched.

22 Claims, 11 Drawing Sheets

REGISTER-BASED PROGRAMMABLE POST-SILICON SYSTEM TO PATCH AND DYNAMICALLY MODIFY THE BEHAVIOR OF SYNCHRONOUS STATE MACHINES

TECHNICAL FIELD

The present invention relates to the field of electrical synchronous state machines. More specifically, the present invention relates to modifying the behavior of a synchronous state machine after it has been fabricated within silicon through the addition and/or subtraction of specific states.

BACKGROUND ART

Within the field of electrical digital systems is a category of systems known as state machines. A state machine is a digital logic device that sequences (based on a timing reference signal) through a finite set of logical states which can have inputs and outputs. The outputs of the state machine are a function of the present state that the state machine is located within and the inputs received by the state machine. The state machine is implemented in fixed digital logic, and can be synthesized from a high-level design language such as VHDL or Verilog.

Figure 1A:
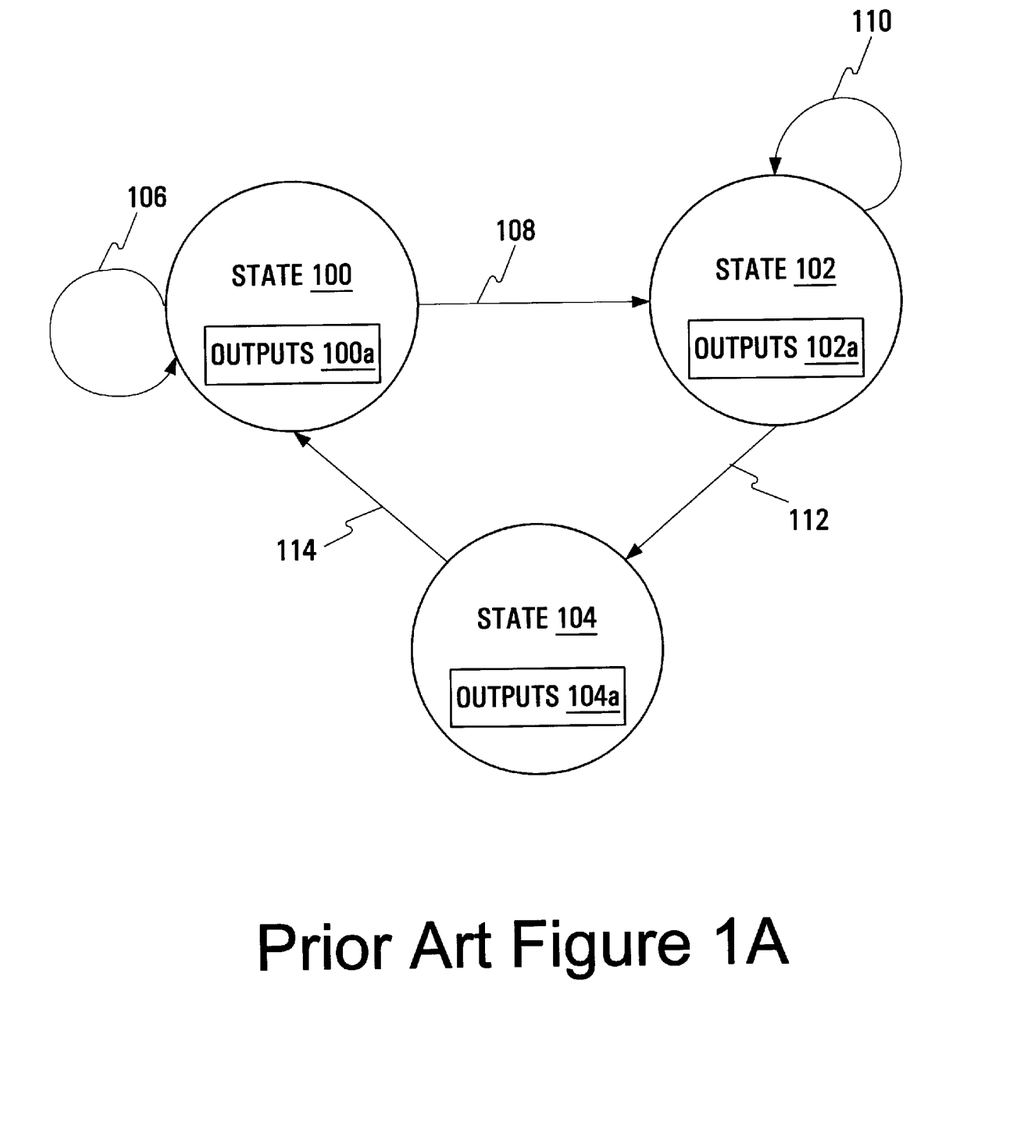
FIG. 1A is an exemplary logical state diagram representing an example of three different states that a prior art state machine sequences through as it performs its operations.

FIG. 1A is a state diagram illustrating an example of three different states that an exemplary state machine sequences through as it performs its operations. Once initialized, the state machine represented by FIG. 1A begins its operation within logical state 100. While within logical state 100, the state machine generates outputs 100a. Upon subsequent clock cycles, the state machine remains within logical state 100 generating outputs 100a, represented by conditional transition term arrow 106, until it receives a predetermined input condition. A conditional transition term causes the outputs of the state machine or its transition into another state to be dependent upon receiving a predetermined input condition while in a particular present state. Therefore, if the state machine receives the predetermined input condition while in state 100, it enters logical state 102 represented by state transition arrow 108. Upon entering state 102, the state machine generates outputs 102a. On subsequent clock cycles, the state machine remains within state 102 generating outputs 102a, represented by conditional transition term arrow 110, until it receives another predetermined input condition. If the state machine receives the predetermined input condition, the state machine enters logical state 104 represented by state transition arrow 112.

Once within logical state 104 of FIG. 1A, the state machine generates outputs 104a for a predetermined amount of time and then re-enters logical state 100, represented by state transition arrow 114. While in state 104, the state machine is not dependent on the receipt of any type of input condition to allow it to enter state 100. Instead, the state machine only remains within state 104 for a predetermined amount of time and then enters state 100. Alternatively, the state transition into state 100 can be based on input conditions. Once the state machine enters state 100, it continues to repeat the sequence of operations described above.

Figure 1B:
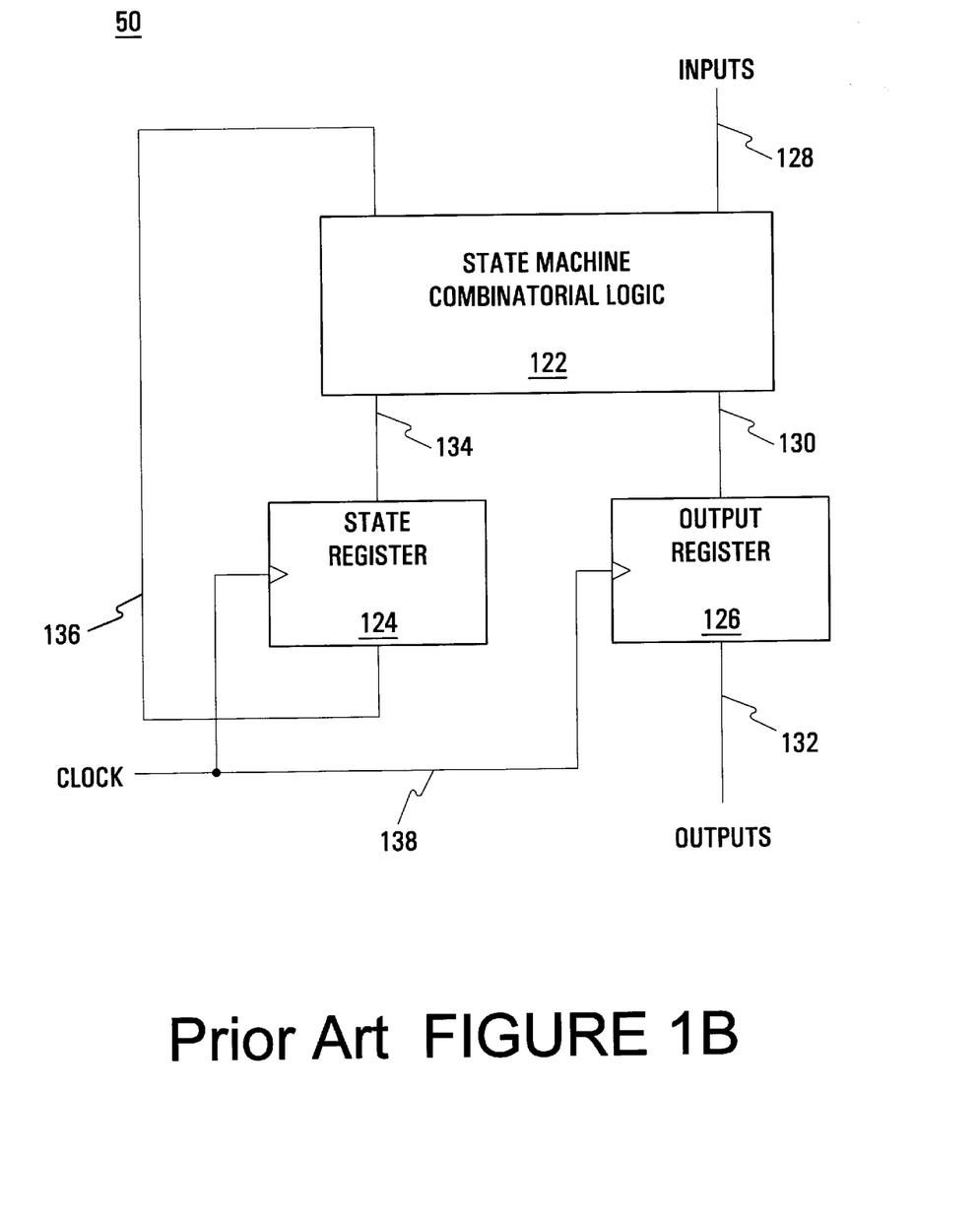
FIG. 1B is a block diagram representing a standard prior art synchronous state machine implemented in circuitry.

FIG. 1B is a block diagram illustrating a standard prior art synchronous state machine circuit 50. Within state machine combinatorial logic 122 is the state machine logic that causes state machine 50 to sequence through various pre-determined states of operation. To more fully understand the operation of the standard prior art state machine 50, the state diagram illustrated within FIG. 1A will be discussed in conjunction with FIG. 1B.

Before the prior art synchronous state machine circuit 50 of FIG. 1B starts operations, it first is initialized. During the initialization of prior art state machine 50, the value that identifies the starting present state of state machine 50 (e.g., logical state 100 of FIG. 1A) is stored within state register 124 of FIG. 1B while the values that identify the outputs of state machine 50 (e.g., outputs 100a) are cleared within output register (latch) 126. Several data bits can be stored within output register 126, each identify different outputs of the state machine. For example, eight bits of data stored within output register 126 could identify eight outputs of state machine 50.

Once initialized, the prior art state machine circuit 50 starts operations within state 100 of FIG. 1A. State register 124 (latch) of FIG. 1B transfers the stored present state value to combinatorial logic 122 over the present state bus 136. At the same time the contents of state register 124 are transferred, the outputs of state machine 50 stored within output register 126 (e.g., outputs 100a) are transferred over output bus 132. State register 124 and output register 126 are both connected to a clock signal by bus 138, which causes both registers to have synchronous operations. State machine circuit 50 of FIG. 1B remains within the present state (e.g., state 100) performing the outputs (e.g., outputs 100a) until a predetermined input condition is received by combinatorial logic 122 over input bus 128.

Once the predetermined input condition is received over input bus 128, combinatorial logic 122 of FIG. 1B transfers to state register 124 the next state value that state machine 50 will be entering (e.g., state 102) over next state bus 134. At the same time combinatorial logic 122 transfers the next state value over bus 134, it also transfers to output register 126 the values that identify the outputs of state machine 50 (e.g., outputs 102a) over next output bus 130. Upon the next clock, state register 124 transfers the present state value to combinatorial logic 122 over the present state bus 136. Output register 126 transfers the outputs of state machine 50 over outputs bus 132. State machine 50 of FIG. 1B remains in state 102 until a predetermined input condition is received by combinatorial logic 122 over input bus 128.

Once the predetermined input condition is received over input bus 128, combinatorial logic 122 of FIG. 1B transfers to state register 124 the next state value that state machine 50 will be entering (e.g., state 104 of FIG. 1A) over next state bus 134. At the same time combinatorial logic 122 transfers the next state value, it also transfers to output register 126 the values that identify the outputs (e.g., outputs 104a) of state machine 50 over next output bus 130. Upon the next clock, state register 124 transfers the present state value to combinatorial logic 122 over the present state bus 136. Output register 126 transfers the outputs of state machine 50 over output bus 132. Once state machine 50 of FIG. 1B enters state 100, it continues to repeat the sequence of operations described above.

State machines are useful in electrical digital systems, but there are several disadvantages associated with state machines. State machines can be complicated. Moreover, the heart of the state machine design is the combinatorial logic, which after fabrication in silicon is modifiable only by difficult and manual methods. These difficult methods include the tedious and error prone task of making changes to the interconnect layers of the die itself. State machines can also have many boundary conditions and corner cases that are difficult to test during simulations which are performed before fabricating the state machine in silicon. Therefore, it would be advantageous to provide a circuit and system for correcting these errors post-fabrication. Furthermore, a designer of a state machine may find that after the state machine has been designed and fabricated, especially if the design was developed quickly for a prototype, that he or she desires to change the behavior of the state machine. Therefore, it would be advantageous to provide a system that allows the behavior of a state machine to be readily modified after it has been fabricated within silicon. The present invention provides these advantages and others not necessary recited above but clear within discussions of the present invention to follow.

DISCLOSURE OF THE INVENTION

The present invention allows the behavior of a circuit implemented state machine to be readily modified by software after it has been fabricated in silicon. To perform these modifications, the present invention uses special patch registers, multiplexers, and comparators to bypass certain states within the existing sequence of states within the combinatorial logic of the state machine and/or add new state sequences. Each patch register stores a state to be patched or modified, a next state, and outputs. The state to be patched stored within the patch register is the state that will be modified, while the next state is the state that the state machine transitions into from the state to be patched, and the outputs are the outputs generated and asserted by the state machine while within the next state. Many such patch registers can be used by the present invention to define many new state modifications. The patch registers are used by the present invention to transition an existing (fabricated) state machine circuit from the state to be patched or modified into a new or existing state. Using this advantageous patch mechanism, the present invention allows new states to be added and existing states to be removed from the sequence of states that the state machine cycles through.

To implement the functionality of the patch registers within the present invention, a separate comparator is connected to each patch register to determine when the present state of the state machine matches the state to be patched as stored within each respective patch register. When these values match, the corresponding comparator sends control signals causing the multiplexers to transfer into the state machine the next state and the outputs as stored within that particular patch register that matched.

One embodiment of the present invention is a state machine circuit that includes a combinatorial logic circuit implemented within a semiconductor substrate. The combinatorial logic circuit sequences through a set of states, each state having a state value, and generating a respective output value corresponding to a particular state. The state machine circuit also includes a state register for holding a current state value that indicates the current state of the state machine circuit. The state register transfers the current state value back to the combinatorial logic circuit. The state machine circuit also includes an output register for holding an output value associated with the current state value of the state machine circuit. A first multiplexer has an input that is coupled to receive a state value from the combinatorial logic circuit and an output that is coupled to supply the state register. A second multiplexer has an input that is coupled to receive an output value from the combinatorial logic circuit and an output that is coupled to supply the output register. A plurality of programmable patch registers are coupled to inputs of the first and second multiplexers for modifying the set of states and the set of outputs which effectively alters the behavior of the state machine circuit. Each of the programmable patch registers includes a state-to-be-patched field, a next state field and an output field. A plurality of comparators are each coupled to the state register and to each of the programmable patch registers. The comparators compare the state-to-be-patched fields within each patch register to determine when to modify the contents of the state register and the output register.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a software modifiable post fabrication state machine, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 2A:
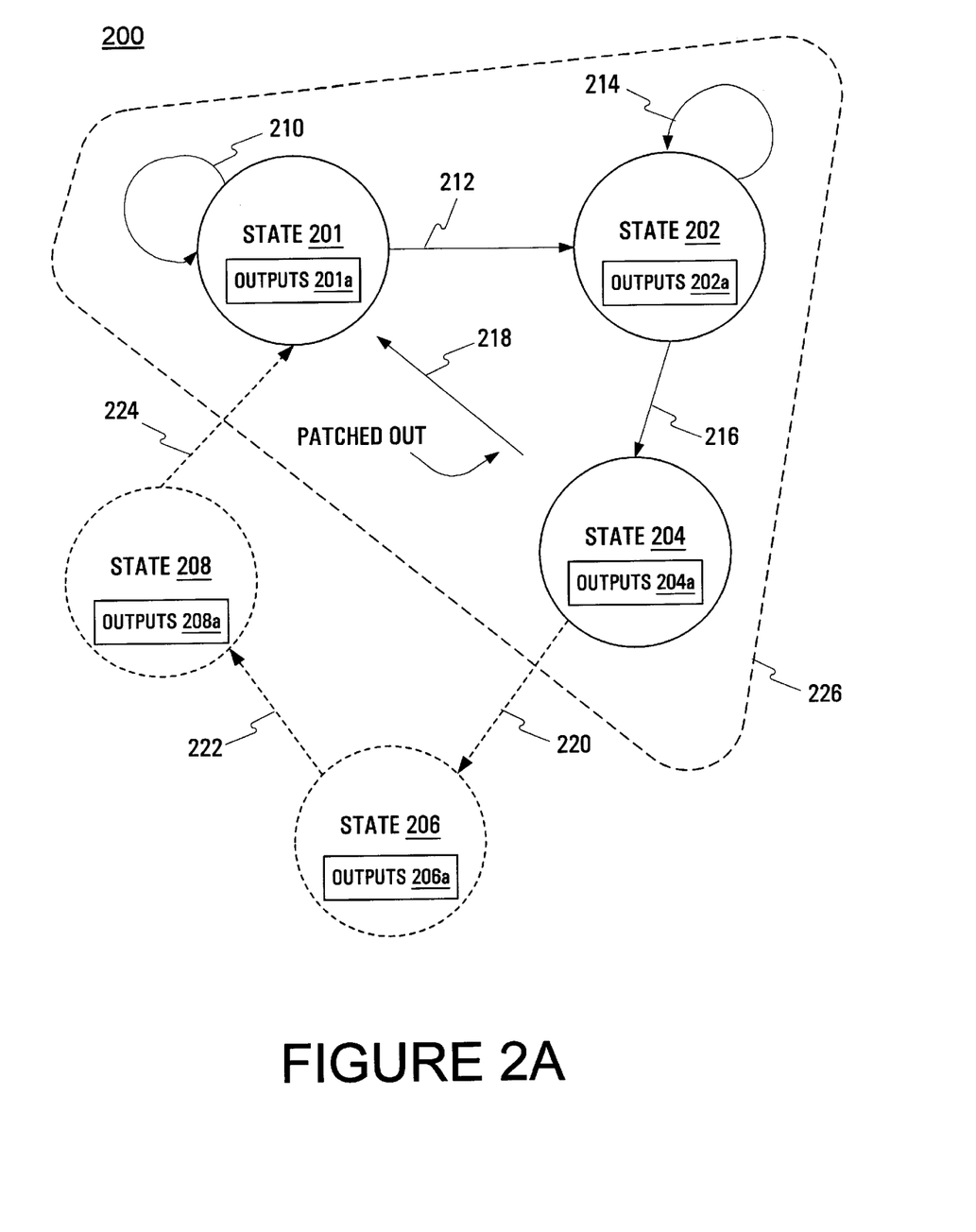
FIG. 2A is a logical state diagram representing the present invention patching in two new states into an existing state machine consisting of three states.

The present invention allows the behavior of an electronic state machine circuit to be readily modified by software after it has been fabricated in silicon. FIG. 2A is a logical state diagram representing how the present invention patches in two new states into an existing state machine design 226 fabricated in silicon, consisting of three states (e.g., states 201–204). The present invention is able to patch in states 206 and 208 into the existing state machine 226 to provide expanded state machine 200. It is appreciated that within one embodiment the new patched in states 206 and 208 do not have conditional transitional branches within them. This embodiment of the present invention does not permit conditional transitional branches to exist within individual new patched in states.

During the operation of patching in states 206 and 208 into the existing state machine 226 of FIG. 2A to create state machine model 200, the present invention removes by logically bypassing the transition term connecting state 204 to state 201, represented by state transition arrow 218. To patch in states 206 and 208, the present invention first inserts a new transition term connecting state 204 to state 206, represented by dashed state transition arrow 220. The present invention next inserts a new transition term connecting state 206 to state 208, represented by dashed state transition arrow 222. To complete the process of patching in states 206 and 208, the present invention inserts a new transition term connecting state 208 to state 201, represented by dashed state transition arrow 224. The final result of the operation of the present invention is a change in the behavior of the existing state machine 226 with the addition of two new states into its operations to create overall state machine 200.

Once initialized, the state machine 200 of FIG. 2A begins its new operations within state 201 where it generates outputs 201a while waiting to receive a predetermined input condition, represented by conditional transition term arrow 210. Upon receipt of the predetermined input condition, state machine 200 transitions into state 202, represented by state transition arrow 212. While in state 202, the state machine continues to generate outputs 202a, represented by conditional transition term arrow 214, until a predetermined input condition is received by state machine 200. Upon receipt of the predetermined input condition, state machine 200 transitions into state 204, represented by state transition arrow 216. While within state 204, state machine 200 generates outputs 204a for a predetermined amount of time. Once the predetermined amount of time has elapsed, state machine 200 transitions into state 206, represented by dashed arrow 220, instead of transitioning into state 201 as the existing state machine 226 was fabricated in combinatorial logic.

While within state 206, state machine 200 generates outputs 206a for a predetermined amount of time. Upon expiration of the predetermined amount of time, state machine 200 transitions into state 208, represented by dashed state transition arrow 222. While in state 208, state machine 200 generates outputs 208a for a predetermined amount of time. Upon expiration of the predetermined amount of time, state machine 200 transitions into state 201, represented by dashed state transition arrow 224. Once state machine 200 enters state 201, it continues to repeat the sequence of operations described above.

Figure 2B:
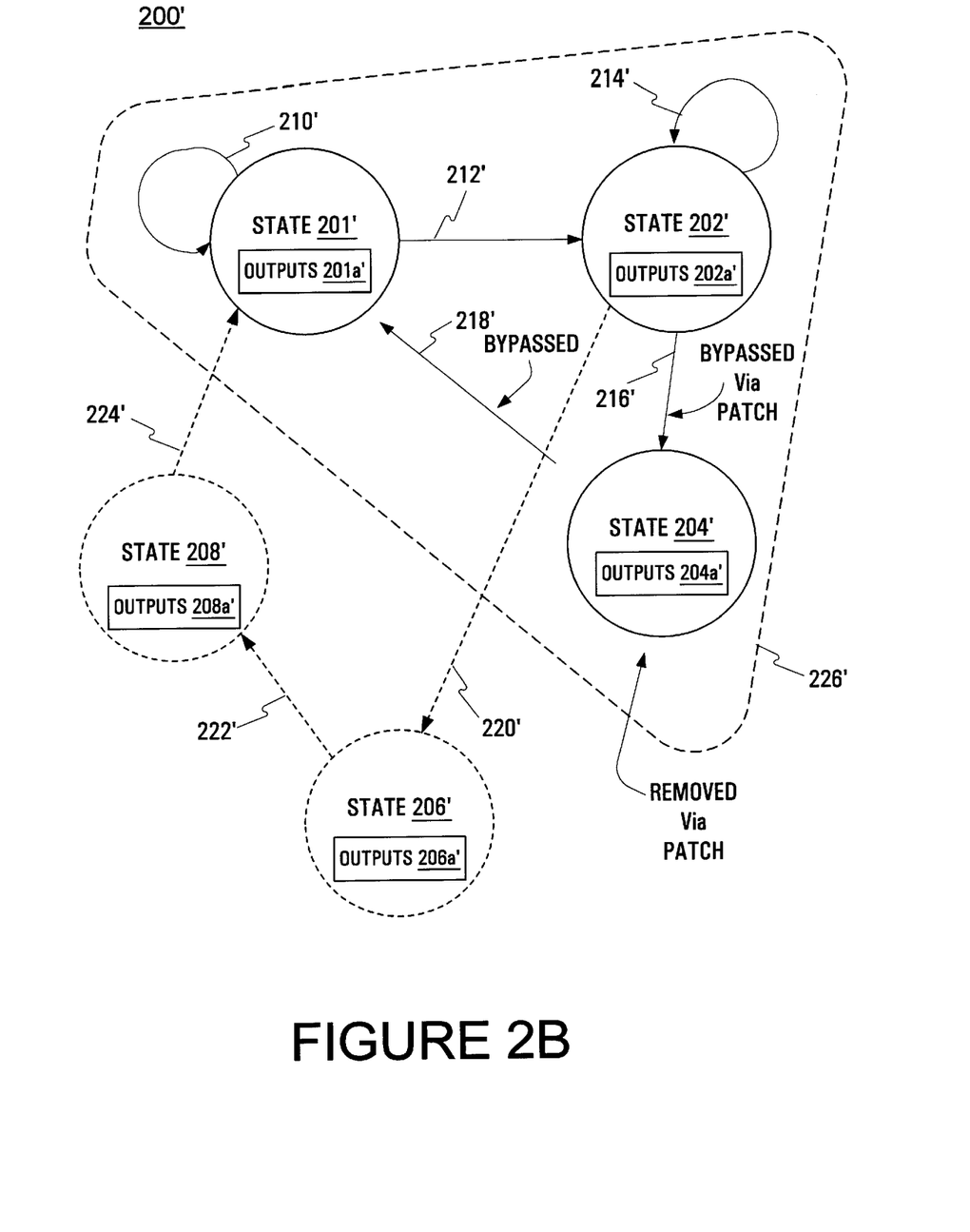
FIG. 2B is a logical state diagram representing the present invention patching in two new states into an existing state machine and patching out an existing state.

FIG. 2B is a logical state diagram representing how the present invention patches in states 206' and 208' into an existing state machine design 226', fabricated in silicon, while at the same time removing an existing state 204'. The present invention is able to patch in states 206' and 208' in the same manner described above for FIG. 2A, except that a new transition term is inserted connecting state 202' to state 206', represented by dashed state transition arrow 220'. By adding this new transition term, the present invention removes state 204' from existing state machine 226' while logically bypassing state transition arrows 216' and 218' helping create overall state machine design 200'. Once overall state machine design 200' enters state 201', it continues to sequence through states 201', 202', 206' and 208'.

Figure 2C:
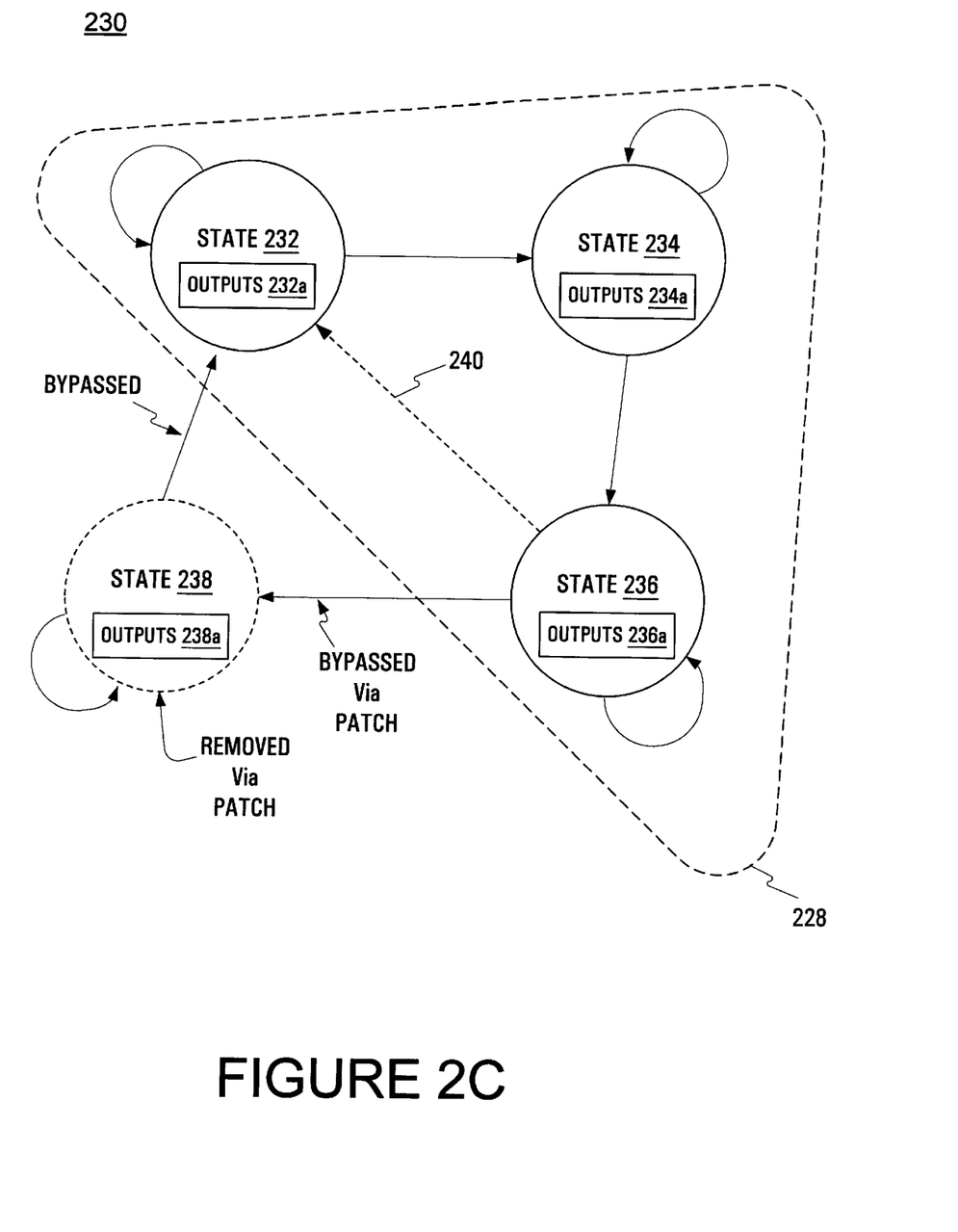
FIG. 2C is a logical state diagram representing the present invention patching out an existing state from an existing state machine consisting of four states.
Figure 3A:
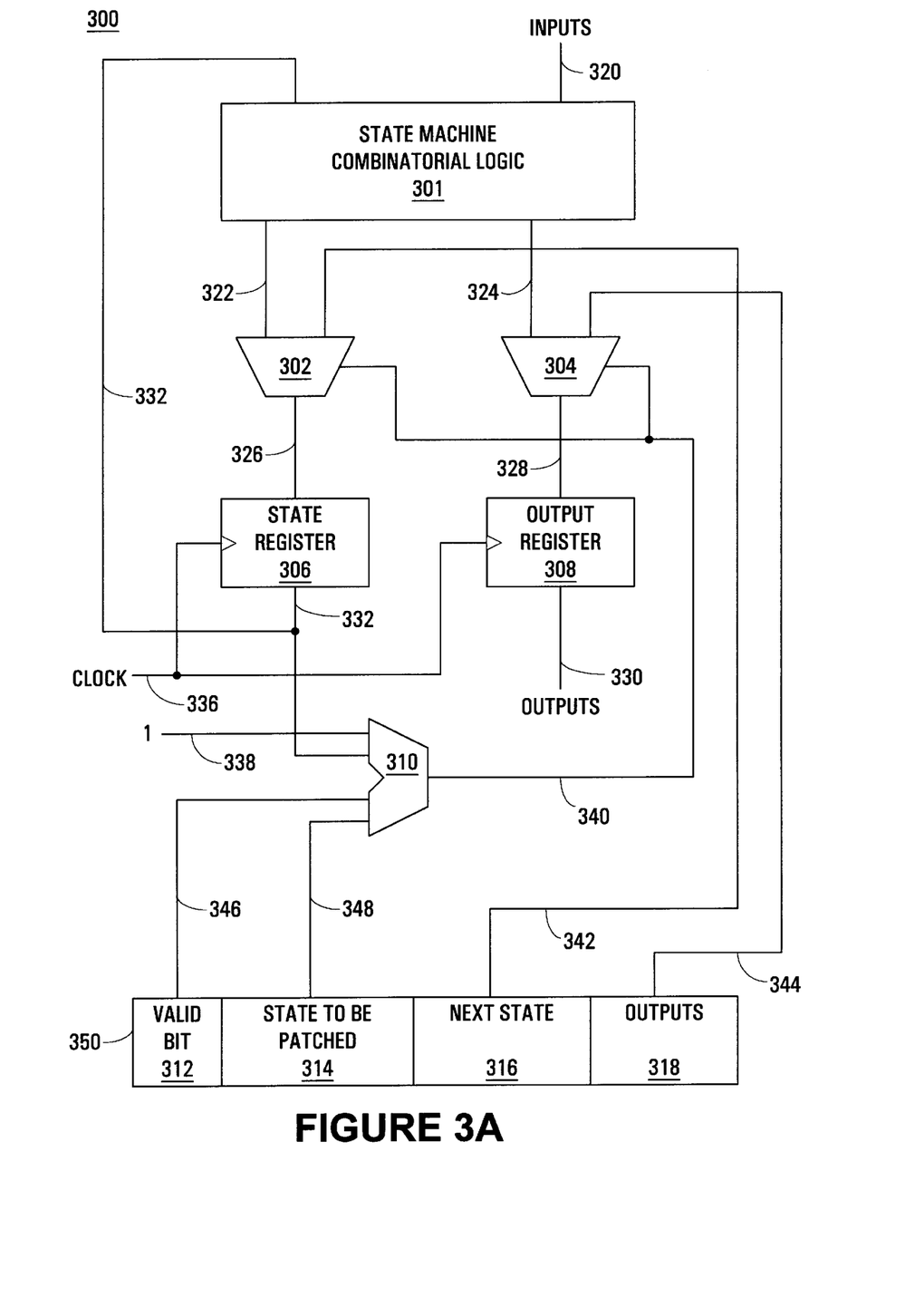
FIG. 3A is a block diagram representing a modifiable synchronous state machine circuit of the present invention having one patch register.

FIG. 3A is a block diagram representing a modifiable synchronous state machine circuit 300 of the present invention including patch register 350. To more fully understand how modifiable synchronous state machine 300 of the present invention operates, the state diagram illustrated within FIG. 2C will also be discussed. It is appreciated that modifiable state machine circuit 300 of FIG. 3A is unable to patch in any new states as shown in FIGS. 2A and 2B because it only contains one patch register 350. For the present invention to patch in a defined amount of states x into an existing state machine, the minimum amount of patch registers that will be required is defined by the value (x+1). For example, to patch in two new states into an existing state machine, three patch registers are needed. The first patch register patches from an existing state of the state machine into a first new state. The second patch register patches from the first new state into a second new state of the state machine. The third patch register patch from the second new state into an existing state of the state machine. With only one patch register, existing states of the state machine can only be patched out.

Before discussing the operation of modifiable state machine 300 of FIG. 3A, it is appreciated that a plurality of patch registers similar to patch register 350 can be used by the present invention to patch in new states or patch out existing states with respect to an existing sequence of states within a state machine. Patch register 350 is realized in programmable nonvolatile memory allocations of a read only memory (ROM), electrically programmable read only memory (EPROM), electrically erasable programmable read only memory (EEPROM), flash memory, etc. Alternatively, patch register can be comprised of registers which are loaded with data before the state machine begins its operation.

With reference to the operation of modifiable state machine 300 FIG. 3A, comparator 310 is connected to control the operation of multiplexers (MUXs) 302 and 304. MUX 302 controls which state value is loaded into the state register while MUX 304 controls which output values are loaded into the output register. MUX 302 receives state values from the combinatorial logic circuit and the next state field of patch register 350. MUX 304 receives output values from the combinatorial logic circuit and the outputs field of patch register 350. Comparator 310 is connected to determine if the data stored within patch register 350 is valid. If valid, comparator 310 determines if the data stored within the state to be patch field matches the data stored within the state register. If they do not match, comparator 310 causes MUXs 302 and 304 to transfer the state value and outputs values received from the combinatorial logic into the state register and outputs register, respectively. If they match, comparator 310 causes MUXs 302 and 304 to transfer the state value and outputs values received from the next state field and outputs field of patch register 350. The state register stores the present state of the modifiable state machine and transfers it into the combinatorial logic and the comparator. The output register stores and transfers the outputs of the modifiable state machine 300.

To specifically understand how the different components of modifiable state machine 300 interact with one another while sequencing through the state diagram of FIG. 2C, a detailed description follows. Modifiable synchronous state machine circuit 300 of FIG. 3A includes patch register 350, which is used by the present invention to patch out existing states (e.g., state 238 of FIG. 2C) with respect to an existing sequence of states (e.g., existing states 230). For patch register 350 and modifiable state machine 300 to operate, they first are initialized. During initialization, the data bit stored within valid bit field 312 is asserted to indicate that the data contained within patch register 350 is valid information. If valid bit field 312 remains unasserted or clear, the modifiable state machine ignores the information stored within patch register 350. Also during initialization, state to be patched field 314 stores data bits identifying the state to be modified or patched (e.g., state 236 of FIG. 2C). State to be patched field 314 stores enough data bits to account for all the states that will eventually exist within state machine 300 operations. For instance, four data bits are able to account for the existence of sixteen different states within state machine 300.

Furthermore, during initialization next state field 316 of FIG. 3A stores data bits identifying the next state to be executed by the state machine operation (e.g., state 232 of FIG. 2C which can be a new state or an existing state). Next state field 316 stores enough data bits to identify all of the states that will exist within state machine 300 operations. Moreover, during initialization outputs field 318 stores data bits identifying the outputs (e.g., outputs 232a) corresponding to the next state stored within next state field 316. Outputs field 318 stores any number of data bits that are needed to identify the outputs to be generated by state machine circuit 300 upon entering the state defined by next state field 316. Initialization also includes storing the data bit value that identifies the present state or first of state machine 300 (e.g., state 232) within state register (latch) 306 and the data bits that identify the outputs of state machine 300 (e.g., outputs 232a) within output register (latch) 308.

Once the modifiable state machine circuit of FIG. 3A has been initialized, it starts its operations within state 232 of FIG. 2C. State register 306 transfers the stored present state value of modifiable state machine 300 to combinatorial logic 301 and comparator 310 over present state bus 332. At the same time the contents of state register 306 are transferred, the data bits stored within output register 308 are output from state machine 300 over output bus 330. State register 306 and output register 308 are both connected to a clock signal by bus 336, which causes both registers to have synchronous operations (e.g., they are latched by the clock signal over bus 336). Modifiable state machine 300 remains within state 232 performing outputs 232a until the proper input condition is received by combinatorial logic 301 over input bus 320.

While modifiable state machine circuit 300 of FIG. 3A is within state 232, comparator 310 compares the data bit of valid bit field 312, received over bus 346, with the high input value (e.g., 5 volts) received over bus 338 to determine if they match. If the input values do not match, comparator 310 ignores the data stored within patch register 350. If the input values match, comparator 310 recognizes the data stored within patch register 350 as valid and compares the present state (e.g., state 232) of the state machine, stored within state register 306, with the data stored within state to be patched 314 (e.g., state 236) to determine if they match. Since the two states do not match in this example, comparator 310 sends a low signal (e.g., 0 volts) to MUXs 302 and 304, over control bus 340. The low signal sent by comparator 310 causes MUXs 302 and 304 to only transfer data they receive from combinatorial logic 301 to latches 306 and 308, respectively, resulting in state machine 300 operations of combinatorial logic 301 remaining unchanged.

Once state machine combinatorial logic 301 of FIG. 3A receives the predetermined input condition over input bus 320, it transfers over bus 322 a next state value to MUX 302 identifying the next state (e.g., state 234) that the state machine will be entering. At the same time combinatorial logic 301 transfers the next state value, it also transfers over bus 324 the next output values to MUX 304 identifying the next outputs (e.g., outputs 234a) of state machine 300. The operation of MUXs 302 and 304 are both controlled by signals received from comparator 310 over control bus 340.

Since comparator 310 of FIG. 3A sent a low signal (e.g., 0 volts) to MUXs 302 and 304, they only transfer data received from combinatorial logic 301. MUX 302 transfers to state register 306, over next state bus 326, the value that identifies the next state (e.g., state 234) that state machine 300 will be entering. MUX 304 transfers to output register 308, over next output bus 328, the values that identify the next outputs (e.g., outputs 234a) of state machine 300. State register 306 transfers the stored present state value of state machine 300 to combinatorial logic 301 and comparator 310 over present state bus 332. Output register 308 transfers the stored data values identifying the outputs of state machine 300 over output bus 330.

Modifiable synchronous state machine circuit 300 of FIG. 3A continues until the present state of the state machine, stored within state register 306, matches the state to be patched value (e.g., state 236) stored within state to be patched field 314. Within FIG. 2C, for example, the present state of the state machine matches the state to be patched when the state machine is located within state 236. When the present state of the state machine of FIG. 3A matches the value stored within state to be patched field 314, comparator 310 sends a high signal (e.g., 5 volts) to MUXs 302 and 304 causing them to only transfer data they receive from next state field 316 and outputs field 318 from patch register 350. The data stored within next state field 316 (e.g., state 232) is transferred to MUX 302 over bus 342, which is then transferred to state register 306 over next state bus 326. The data bits stored within outputs field 318 (e.g., outputs 232a) are transferred to MUX 304 over bus 344, which is then transferred to output register 308 over next output bus 328. State register 306 transfers the stored present state value to combinatorial logic 301 and comparator 310 over present state bus 332. Output register 308 transfers the stored output values of state machine 300 over output bus 330.

The operation of MUXs 302 and 304 of FIG. 3A causes modifiable state machine 300 to transition from state 236 of FIG. 2C into state 232, represented by dashed state transition arrow 240. By performing this operation, the MUXs in effect remove state 238 and bypasses the transition terms into and out of state 238. The operation of modifiable state machine 300 now sequences through the new sequence of states 228.

Figure 2D:
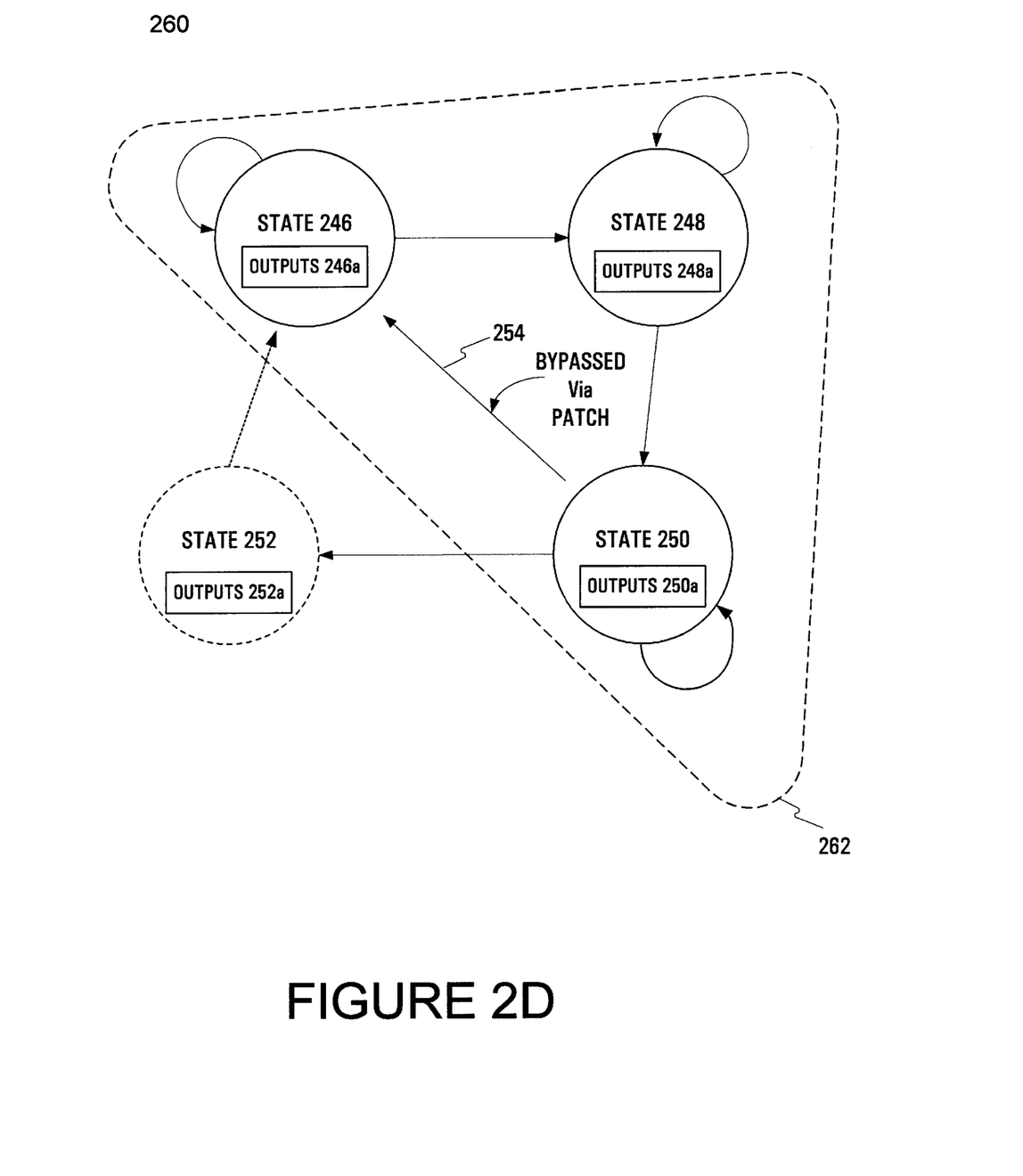
FIG. 2D is a logical state diagram representing the present invention patching in a new state into an existing state machine consisting of three states.
Figure 3B:
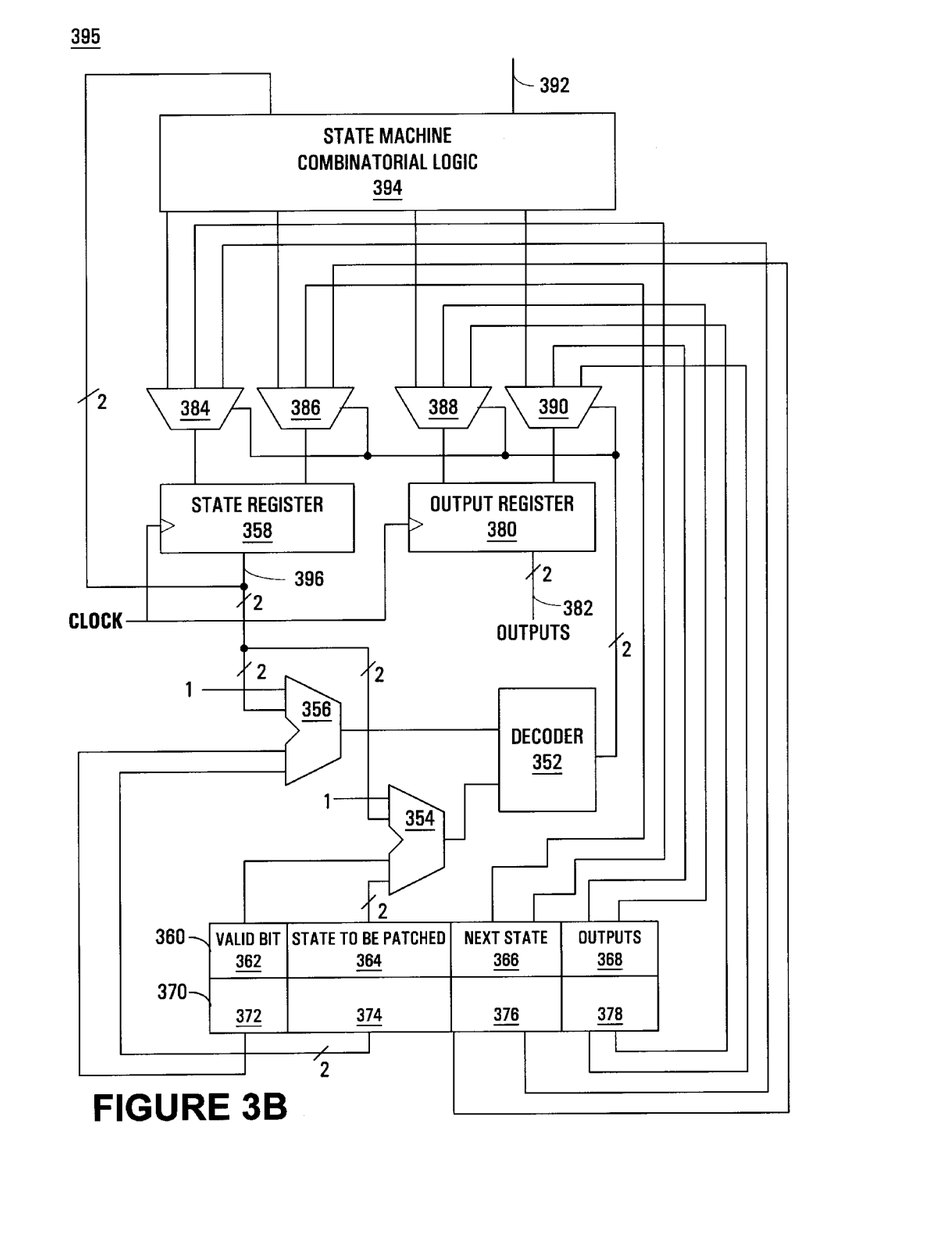
FIG. 3B is a schematic diagram representing the connections of a modifiable synchronous state machine circuit of the present invention having two patch registers.

FIG. 3B is a schematic diagram representing the connections of a two patch register modifiable synchronous state machine circuit 395 of the present invention. To more fully understand how modifiable synchronous state machine 395 having two patch registers operates, the state diagram illustrated within FIG. 2D will also be discussed. Since there are two patch registers located within modifiable state machine circuit 395, only one new state may be patched into the existing states 262 of FIG. 2D.

Before discussing the operation of modifiable state machine 395 of FIG. 3B, it is appreciated that the individual fields contained within patch registers 360 and 370 each store a specific amount of data bits. For example, valid bit fields 362 and 372 each store one data bit while state to be patch fields 364 and 374 each store two data bits. Furthermore, next state fields 366 and 376 each store two data bits while outputs fields 368 and 378 each store two data bits. A corresponding bus is connected to transfer each data bit stored within patch registers 360 and 370 to other components of modifiable state machine circuit 395.

For the modifiable state machine of FIG. 3B to operate, it first is initialized. During initialization, the data bit stored within valid bit fields 362 and 372 are each asserted to indicate that the information stored within patch registers 360 and 370 is valid information. Also during initialization, both state to be patched fields 364 and 374 are loaded with values identifying the specific states to be modified or patched. Specifically for this example, state to be patched field 364 is loaded with a value identifying state 250 of FIG. 2D while state to be patched field 374 is loaded with a value identifying state 252. Notice that two output lines are connected to state to be patched field 364 and 374.

Furthermore, during initialization both next state fields 366 and 376 are loaded with values identifying the next state that will follow the state to be patched into the sequence of states of state machine 395. Specifically for this example, next state field 366 is loaded with a value identifying state 252 while next state field 376 is loaded with a value identifying state 246. Moreover, during initialization outputs fields 368 and 378 are loaded with values identifying the outputs of state machine 395 that correspond to the states stored within next state fields 366 and 376. Specifically for this example, outputs field 368 is loaded with values identifying outputs 252a while outputs field 378 is loaded with values identifying outputs 246a. Furthermore, during the initialization of state machine 395, the value that identifies the present state of state machine 395 (e.g., state 246) is stored within state register 358 while the values that identify the outputs of state machine 395 (e.g., outputs 246a) are stored within output register 380.

Once modifiable state machine 395 of FIG. 3B has been initialized, it starts its operations within state 246 of FIG. 2D. State register 358 transfers the stored present state value of state machine 395 over present state bus 396 to combinatorial logic 394 and comparators 354 and 356. At the same time the contents of state register 358 are transferred, the contents stored within output register 380 are output from state machine 395 over output bus 382. Modifiable state machine 395 remains within state 246 generating outputs 246a until a predetermined input condition is received by combinatorial logic 394 over input bus 392.

While modifiable state machine circuit 395 of FIG. 3B is within state 200, comparator 354 compares the stored data bit of valid bit field 362 with a received high input value (e.g., 5 volts) to determine if they match. If they do not match, comparator 354 ignores the data stored within patch register 360. If they match, comparator 354 recognizes the data stored within patch register 360 as valid and compares the present state (e.g., state 246) of modifiable state machine circuit 395, stored within state register 358, with the data value stored within state to be patched 364 (e.g., state 250) to determine if they match. Since the two states do not match, comparator 354 sends a low signal (e.g., 0 volts) to decoder 352. At the same time comparator 354 is performing its operations on patch register 360, comparator 356 is performing the same types of comparison operations on the contents stored within patch register 370 as performed by comparator 354, as described above.

The operation of MUXs 384–390 are all controlled by control signals that originate from decoder 352. MUXs 384 and 386 each receive from combinatorial logic 394, next state field 366, and next state field 376 a specific data bit position of the value identifying a next state of state machine 395. The control signals received from decoder 352 determine which next state value is allowed to be transferred into state register 358. Similarly, MUXs 388 and 390 each receive from combinatorial logic 394, outputs field 368, and outputs field 378 a specific data bit position of the values identifying the next outputs of state machine 395. The control signals received from decoder 352 determine which outputs values are allowed to be transferred into output register 380.

Since decoder 352 received low signals (e.g., 0 volts) from comparators 354 and 356, it sends control signals to multiplexers (MUXs) 384–390 to only transfer data they receive from combinatorial logic 394, resulting in modifiable state machine 395 operations of combinatorial logic 394 remaining unchanged.

Once combinatorial logic 394 of FIG. 3B receives the predetermined input condition over input bus 392, it transfers a next state value to MUXs 384 and 386 identifying the next state (e.g., state 248) that the state machine will be entering. MUXs 384 and 386 each receive a specific data bit position of the value identifying the next state of state machine 395 and transfer it into state register 358. At the same time combinatorial logic 394 transfers the next state value, it also transfers the values of the next outputs to MUX 388 and 390 identifying the next outputs (e.g., outputs 248a) of state machine 395. MUXs 388 and 390 each receive a specific data bit position of the values identifying the next outputs of state machine 395 and transfer them into output register 380. State register 358 transfers the stored present state value of modifiable state machine 395 to combinatorial logic 394 and comparators 354 and 356 over present state bus 396. Output register 380 transfers the stored values identifying the outputs of state machine 395 over output bus 382.

Modifiable synchronous state machine circuit 395 of the present invention of FIG. 3B continues until the present state of the modifiable state machine, stored within state register 358, matches either state to be patched value stored within state to be patched fields 364 or 374. Within FIG. 2D, state 250 is the first occurrence of where the present state of state machine 395 matches the state to be patched. When the present state of modifiable state machine 395 of FIG. 3B matches the value stored within state to be patched field 364 (e.g., state 250), comparator 354 sends a high signal (e.g., 5 volts) to decoder 352.

Decoder 352 determines that comparator 354 sent the high signal and then signals MUXs 384–390 to only transfer data bits received from next state field 366 and output field 368. The data bits stored within next state fields 366 (e.g. state 252) are transferred to MUXs 384 and 386, which are then transferred into state register 358. The data bits stored within output fields 368 (e.g., outputs 252a) are transferred to MUXs 388 and 390, which are then transferred into output register 380. State register 358 transfers the stored present state value (e.g., state 252) of modifiable state machine 395 to combinatorial logic 394 and comparators 354 and 356 over present state bus 396. Output register 380 transfers the stored output values (e.g., outputs 252a) of state machine 395 over output bus 382.

Since the present state (e.g., state 252) of modifiable state machine circuit 395 of FIG. 3B matches the state to be patched value (e.g., state 252) stored within state to be patched field 374, comparator 356 sends a high signal (e.g., 5 volts) to decoder 352. Decoder 352 determines that comparator 356 sent the high signal and then signals MUXs 384–390 to only transfer data bits received from next state field 376 and output field 378. The data bits stored within next state field 376 (e.g., state 246) are transferred to MUXs 384 and 386, which are then transferred to state register 358. The data bits stored within output field 378 (e.g., outputs 246a) are transferred to MUXs 388 and 390, which are then transferred to output register 380.

State register 358 transfers the stored present state value (e.g., state 246) to combinatorial logic 394 and comparators 354 and 356 over present state bus 396. Output register 380 transfers the stored output values (e.g., outputs 246a) of state machine 395 over output bus 382. The modifiable state machine of FIG. 3B continues sequencing through states 246, 248, 250, and new patched in state 252 performing its desired operations.

Figure 4A:
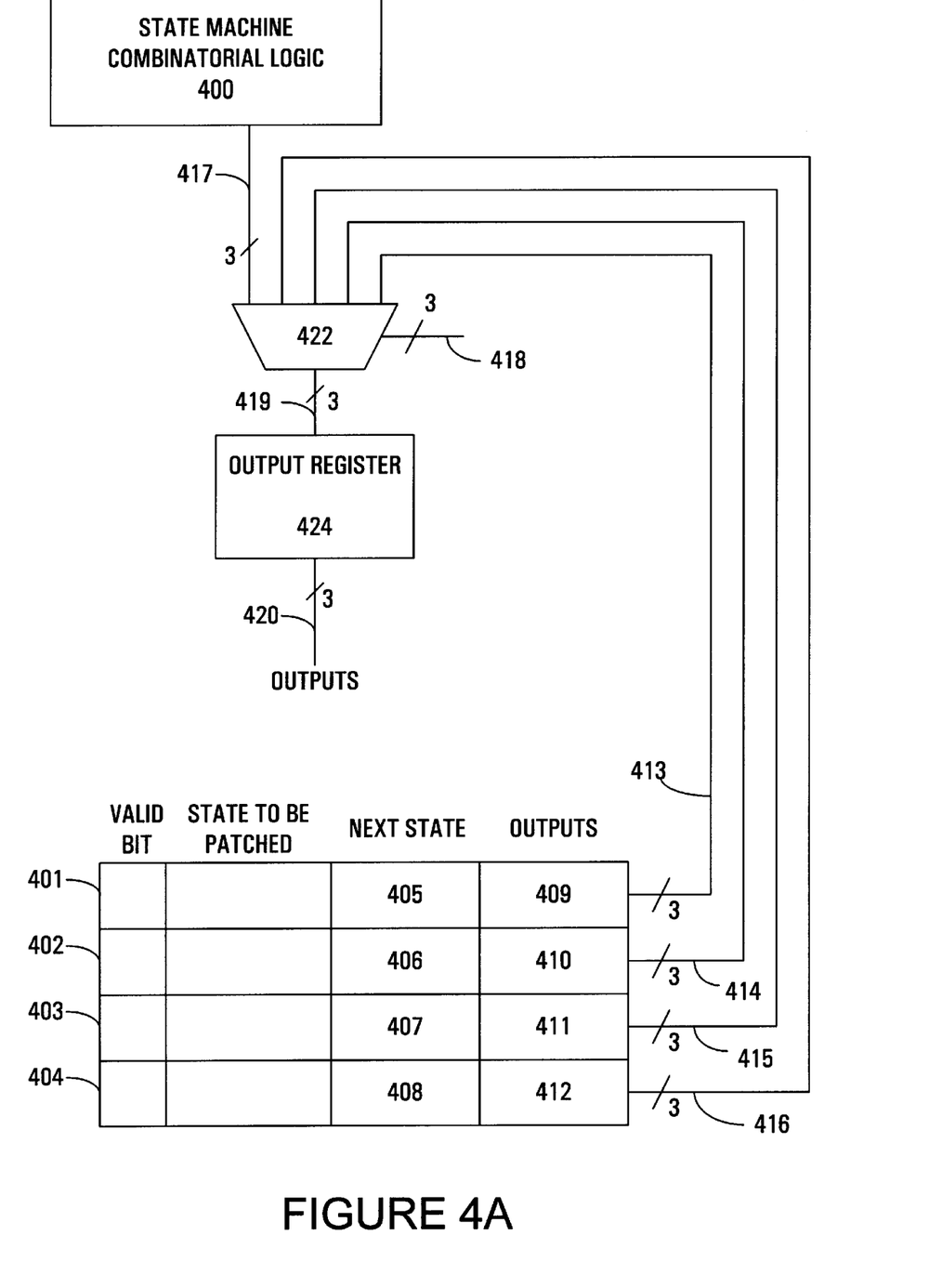
FIG. 4A is a block diagram representing the manner in which each outputs field of four patch registers are connected to the next outputs multiplexer within a modifiable synchronous state machine circuit of the present invention.
Figure 4B:
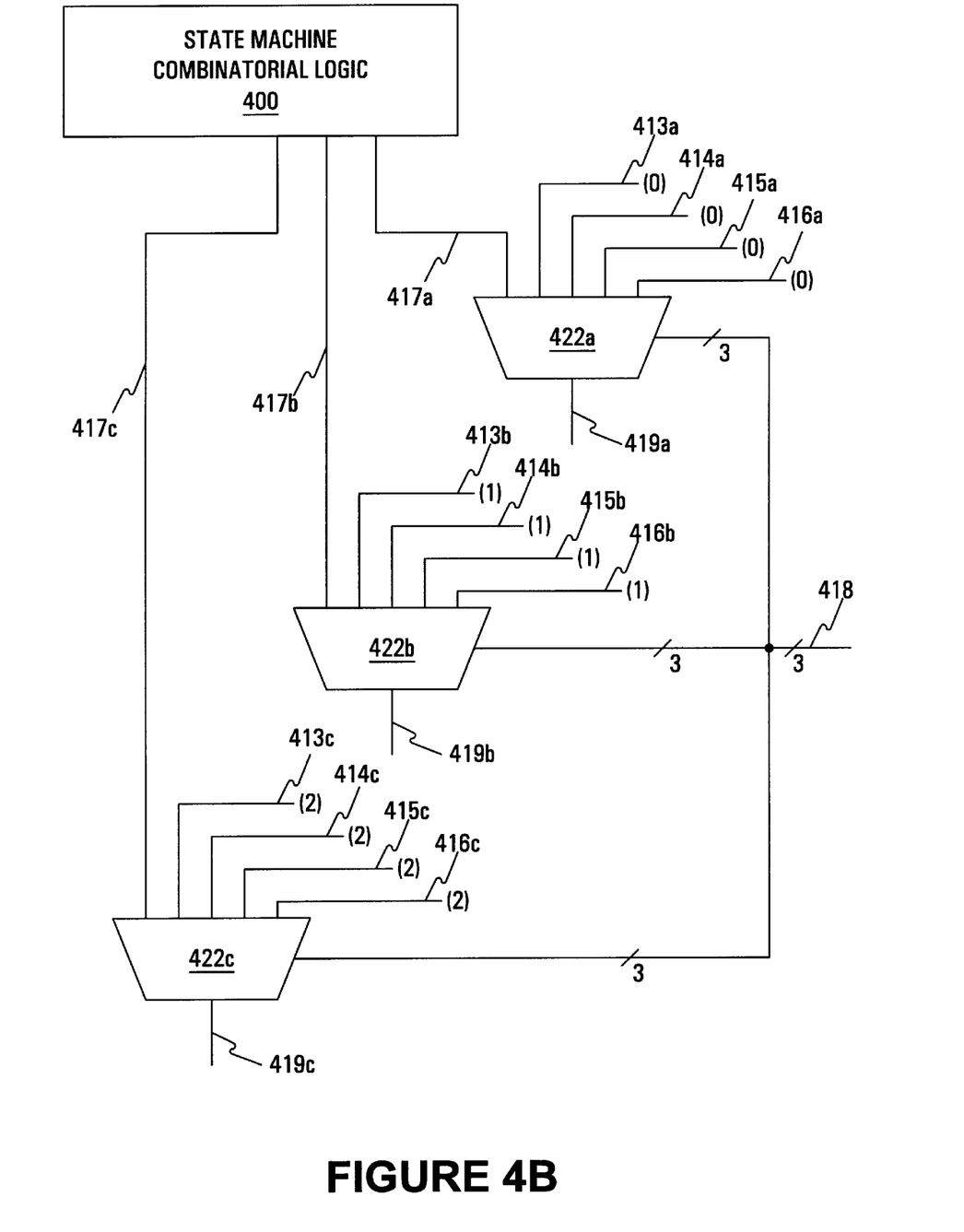
FIG. 4B is a schematic diagram representing the manner in which each outputs field of four patch registers are specifically connected to the next outputs multiplexers within a modifiable synchronous state machine circuit of the present invention.
Figure 4C:
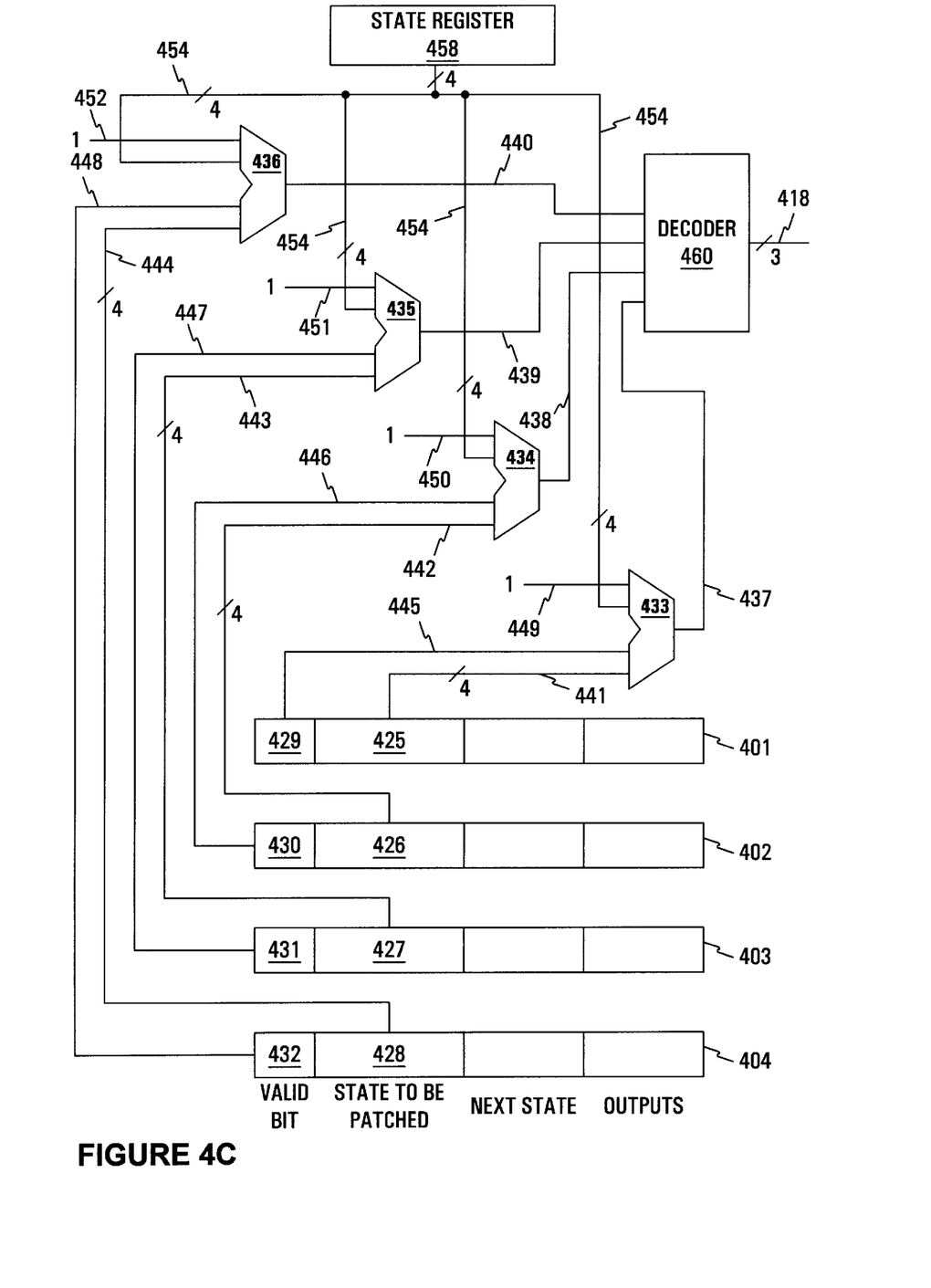
FIG. 4C is a schematic diagram representing the manner in which each valid bit field and each state to be patched field of four patch registers are specifically connected to each comparator within a modifiable synchronous state machine circuit of the present invention.

To more fully understand how a four patch register modifiable synchronous state machine of the present invention would be specifically connected, FIGS. 4A, 4B, and 4C are provided. FIG. 4A is a block diagram representing the manner in which each outputs field of patch registers 401–404 is connected to the next output multiplexer 422a within a modifiable synchronous state machine circuit of the present invention.

Within FIG. 4A, three bits of data are used within combinatorial logic 400 and within outputs fields 409–412 to identify the outputs of the modifiable synchronous state machine circuit of FIGS. 4A, 4B, and 4C. Next outputs multiplexer 422 receives all the data bits from combinatorial logic 400 and outputs fields 409–412. The operation of MUX 422 is controlled by signals received from decoder 460 of FIG. 4C over control bus 418. The data identifying the outputs of the modifiable state machine circuit are transferred by MUX 304a to output register 308a over next output bus 419. Output register 424 transfers the outputs of the modifiable state machine over output bus 420.

FIG. 4B is a schematic diagram representing how each outputs field of patch registers 401–404 are specifically connected to the next outputs multiplexers 422a–422c within a four patch register modifiable synchronous state machine circuit of the present invention. MUXs 422a–422c represent the amount of multiplexers needed to perform the function of next outputs MUX 422 of FIG. 4A. Since three bits of data are used to identify the outputs of the state machine within combinatorial logic 400 and within outputs fields 409–412 of FIG. 4A, a multiplexer is designated to receive each specific bit position of the values that identify the outputs of the four patch register state machine. In other words, the amount of data bits used to identify the outputs of the state machine equals the amount of multiplexers required.

For instance, MUX 422a receives over output lines 413a–416a all the zero bit positions of the values identifying the outputs of the state machine stored within outputs fields 409–412, respectively. Furthermore, MUX 422a receives over bus 417a the zero bit position of the values that identify the outputs of the state machine used within combinatorial logic 400. MUX 422b receives over output lines 413b–416b all the one bit positions of the values identifying the outputs of the state machine stored within outputs fields 409–412, respectively. Moreover, MUX 422b receives over bus 417b the one bit position of the values that identify the outputs of the state machine used within combinatorial logic 400. MUX 422c receives over output lines 413c–416c all the two bit positions of the values identifying the outputs of the state machine stored within outputs fields 409–412, respectively. Furthermore, MUX 422c receives over bus 417c the two bit position of the values that identify the outputs of the state machine used within combinatorial logic 400.

The operation of MUXs 422a–422c are controlled by signals received from decoder 460 of FIG. 4C over control bus 418. The control signals received over control bus 418 determine which output values are allowed to be transferred to output register 424 of FIG. 4A over next output lines 419a–419c.

In the same manner that outputs fields 409–412 of FIG. 4A are each connected to MUXs 422a–422c of FIG. 4B, next state fields 405–408 of FIG. 4A are each connected to multiplexers which are connected to the state register of the four patch register modifiable synchronous state machine circuit. The amount of next state multiplexers that are used is equal to the amount of data bits which are used to identify all the states that will eventually exist within the four patch register modifiable state machine circuit. For example, if four data bits are stored within each next state fields 405–408 to identify the next states that exist within the modifiable state machine, four multiplexers will be used to each receive a specific data bit position of the four data bit value.

FIG. 4C is a schematic diagram representing how valid bit fields 429–432 and state to be patched fields 425–428 of patch registers 401–404 are specifically connected to comparators 433–436 within a four patch register modifiable synchronous state machine circuit of the present invention. Notice that patch registers 401–404 are each connected to corresponding comparators 433–436, respectively. For each patch register that exists within the modifiable synchronous state machine circuit of the present invention, a corresponding comparator is connected to the valid bit field and state to be patched field of each patch register.

For instance, comparator 433 of FIG. 4C receives stored data bits of patch register 401 located within valid bit field 429 and state to be patched 425 over lines 445 and 441, respectively. Likewise, comparator 434 receives stored data bits of patch register 402 located within valid bit field 430 and state to be patched 426 over lines 446 and 442, respectively. Furthermore, comparator 435 receives stored data bits of patch register 403 located within valid bit field 431 and state to be patched 427 over lines 447 and 443, respectively. Moreover, comparator 436 receives stored data bits of patch register 404 located within valid bit field 432 and state to be patched 428 over lines 448 and 444, respectively.

State register 458 of FIG. 4C receives the data bits identifying the present state of the four patch register modifiable state machine over next state bus 456. Comparators 433–436 each receive the data bits identifying the present state of the four patch register state machine, stored within state register 458, over present state bus 454. Moreover, comparators 433–436 also each receive a high input value (e.g., 5 volts) over input lines 449–452, respectively. Furthermore, comparators 433–436 each transfer signals to decoder 460 over lines 437–440, respectively. Decoder 460 transfers control signals to MUXs 422a–422c of FIG. 4B over control bus 418.

FIGS. 4A, 4B, and 4C illustrate how a four patch register modifiable synchronous state machine of the present invention could be connected to perform its functionality.

To implement the modifiable synchronous state machine circuit of the present invention can use any type of random access memory (RAM), read only memory (ROM), electrically programmable read only memory (EPROM), electrically erasable programmable read only memory (EEPROM), flash memory, programmable logic arrays (PLAs), etc. within an integrated circuit chip. Alternatively, patch registers 401–404 of the present invention can be comprised of registers which could, for example, be situated in a PCI chip within the configuration space of the PCI bus. In this case the register would not require any RAM, ROM, EPROM, EEPROM, PLAs or flash memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A state machine circuit comprising:
    a combinatorial logic circuit implemented in a semiconductor substrate for sequencing through a set of states, each of said states having a state value and generating a respective output value;
    a state register for holding a current state value indicating the current state of said state machine circuit, said current state value coupled back to said combinatorial logic circuit;
    an output register for holding an output value associated with said current state value;
    a first multiplexer having an input coupled to receive a state value from said combinatorial logic circuit and an output coupled to supply said state register;
    a second multiplexer having an input coupled to receive an output value from said combinatorial logic circuit and an output coupled to supply said output register;
    n programmable patch registers coupled to inputs of said first and second multiplexers for modifying said set of states, each programmable patch register comprising a state-to-be-patched field, a next state field and an output field; and
    n comparators coupled to said state register and to said n programmable patch registers, said n comparators comparing said state-to-be-patched fields to determine when to modify said state register and said output register.

2. A state machine as described in claim 1 wherein said n programmable patch registers allow n−1 new states with n−1 associated new output values to be inserted into said set of states at a location where one state of said set of states matches one state-to-be-patched field.

3. A state machine as described in claim 1 wherein said n programmable patch registers allow at least one state of said set of states to be bypassed out of said set of states.

4. A state machine as described in claim 1 wherein said n programmable patch registers allow at least one state of said set of states to be bypassed out of said set of states and also allow at least one new state with an associated new output value to be inserted into said set of states.

5. A state machine circuit as described in claim 4 further comprising a control signal determined by said n comparators and wherein said first multiplexer and said second multiplexer are each coupled to receive said control signal which causes said first multiplexer to select between a state value from said combinatorial logic circuit and a state value from a next state field of said n programmable patch registers and which further causes said second multiplexer to select between an output value from said combinatorial logic circuit and an output value from an output field of said n programmable patch registers.

6. A state machine circuit as described in claim 5 further comprising a decoder circuit coupled to receive output signals of said n comparators and for generating said control signal therefrom.

7. A state machine circuit as described in claim 4 wherein each patch register of said n programmable patch registers further contains a valid bit field which is used to determine if information stored within each patch register is valid.

8. A state machine circuit as described in claim 7 wherein said n comparators ignore a particular patch register of said n programmable patch registers if its associated valid bit field is indicated as invalid.

9. A state machine circuit as described in claim 4 wherein said state register and said output register are latches and further comprising:
    an input bus coupled to supply input values to said combinatorial logic circuit; and
    a clock circuit coupled to synchronize said state register and said output register.

10. A circuit comprising:
    a state machine circuit comprising:
        a state machine combinatorial logic circuit which implements a set of states and a set of respective outputs which said state machine circuit generates for each state of said set of states;
        a first multiplexer coupled to receive and transfer said set of states from said state machine combinatorial logic circuit;
        a second multiplexer coupled to receive and transfer said set of outputs from said state machine combinatorial logic circuit;
        a state register coupled to said first multiplexer to receive and store said set of states of said state machine combinatorial logic;
        an output register coupled to said second multiplexer to receive and store said set of outputs of said state machine combinatorial logic;
    a patch register coupled to output to said first and second multiplexers, said patch register used to supply state and output data to modify said set of states and said set of respective outputs of said state machine circuit; and
    a comparator coupled to said state machine circuit and to said patch register for comparing state information in said patch register with state information in said state register to determine when to modify said set of states and said set of outputs.

11. A circuit as described in claim 10 wherein said patch register comprises a state to be patched field and a next state field containing said state information and a output field containing said output information.

12. A circuit as described in claim 11 wherein said first multiplexer is also coupled to receive said state information stored within said patch register.

13. A circuit as described in claim 12 wherein said second multiplexer is also coupled to receive said output information stored within said output field of said patch register.

14. A circuit as described in claim 13 wherein said comparator generates a control signal received by said first and second multiplexers causing said first multiplexer to select between a state value output by said combinatorial logic circuit and a state value output from said patch register and causing said second multiplexer to select between an output value output by said combinatorial logic circuit and an output value output from said patch register.

15. A circuit as described in claim 11 wherein said comparator is coupled to said state register and compares said set of states of said state machine combinatorial logic circuit with said state to be patched field of said patch register to determine when to modify said set of states and said set of outputs.

16. A circuit as described in claim 11 wherein said patch register is used to bypass a state of said set of states.

17. A circuit as described in claim 11 wherein said state register is coupled to transfer said set of states to said comparator and to an input of said state machine combinatorial logic.

18. A modifiable state machine circuit comprising:
   a state machine circuit comprising:
      a state machine combinatorial logic circuit implemented in a substrate, said state machine combinatorial logic circuit realizing a set of states and a set of outputs;
      a first multiplexer coupled to receive and transfer said set of states from said state machine combinatorial logic circuit;
      a second multiplexer coupled to receive and transfer said set of outputs from said state machine combinatorial logic circuit;
      a state register coupled to receive a state from said first multiplexer and to transfer said state to said state machine combinatorial logic circuit;
      an output register coupled to receive an output from said second multiplexer;
   a plurality of patch registers for modifying said set of states, each patch register containing a state to be patched, a next state and an output wherein each state to be patched is coupled to an input of said first multiplexer and each output is coupled to an input of said second multiplexer; and
   comparators coupled to said state register and to each state to be patched stored within said plurality of patch registers to determine when to modify said set of states and said set of outputs.

19. A modifiable state machine circuit as described in claim 18 wherein said first multiplexer and said second multiplexer are each coupled to receive a control signal dependent upon said comparators which causes said first multiplexer to transfer a specific state signal into said state register and causes said second multiplexer to transfer a specific output signal into said output register.

20. A modifiable state machine circuit as described in claim 19 wherein each patch register of said plurality of patch registers further stores a valid bit which is used to determine if information stored within each patch register is valid.

21. A modifiable state machine circuit as described in claim 20 wherein each comparator is coupled to compare a valid bit stored within a respective patch register with a predetermined value to determine if said information stored within said respective patch register is valid.

22. A modifiable state machine circuit as described in claim 19 further comprising a decoder circuit which is coupled to receive signals from said comparators and coupled to generate said control signal.

* * * * *